G. ACKERMAN.
BEET HARVESTER.
APPLICATION FILED OCT. 19, 1915.

1,198,985.

Patented Sept. 19, 1916.
2 SHEETS—SHEET 1.

Inventor:
George Ackerman
by F. M. Thoonds
Atty.

G. ACKERMAN.
BEET HARVESTER.
APPLICATION FILED OCT. 19, 1915.

1,198,985.

Patented Sept. 19, 1916.
2 SHEETS—SHEET 2.

Inventor:
George Ackerman
by J M Thomas
Atty.

UNITED STATES PATENT OFFICE.

GEORGE ACKERMAN, OF SALT LAKE CITY, UTAH.

BEET-HARVESTER.

1,198,985.  Specification of Letters Patent.  Patented Sept. 19, 1916.

Application filed October 19, 1915. Serial No. 56,801.

*To all whom it may concern:*

Be it known that I, GEORGE ACKERMAN, a citizen of the United States, residing at Salt Lake City, in the county of Salt Lake and State of Utah, have invented certain new and useful Improvements in Beet-Harvesters, of which the following is a specification.

My invention relates to beet harvesters, and has for its object to provide a machine for digging, pulling and topping beets that is economical in labor and in cost of construction, and that will adjust beets of different sizes and plane of growth so that the cutting of the foliage will be at the head of the beet whether the beet root is large or small, or has grown low in the ground or partially out of the ground. These objects I accomplish with the machine illustrated in the accompanying drawings in which similar letters and numerals of reference indicate like parts throughout the several figures and as described in the specification forming a part of this application and pointed out in the appended claims.

Figure 1:
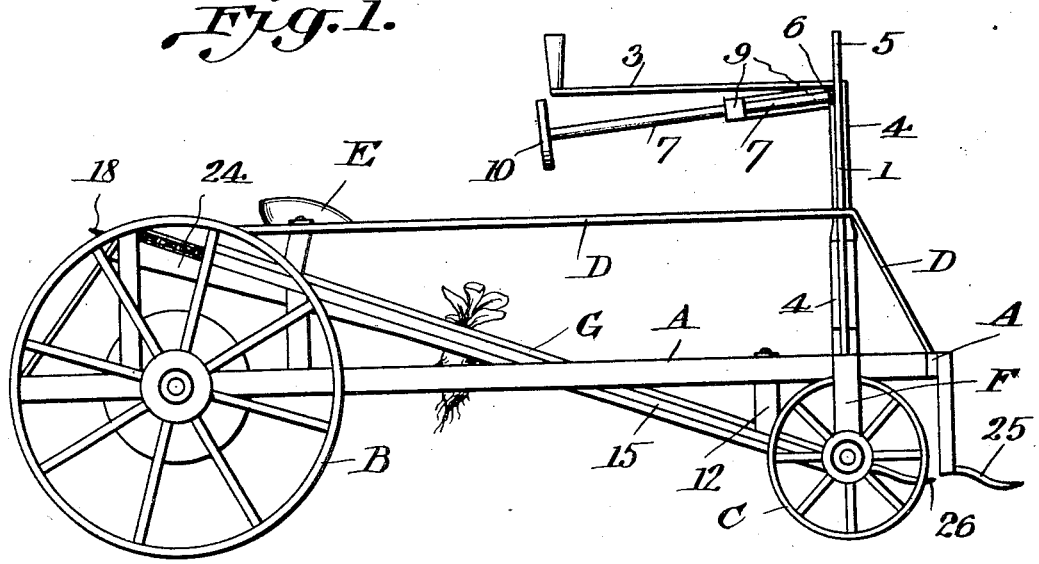
Figure 2:
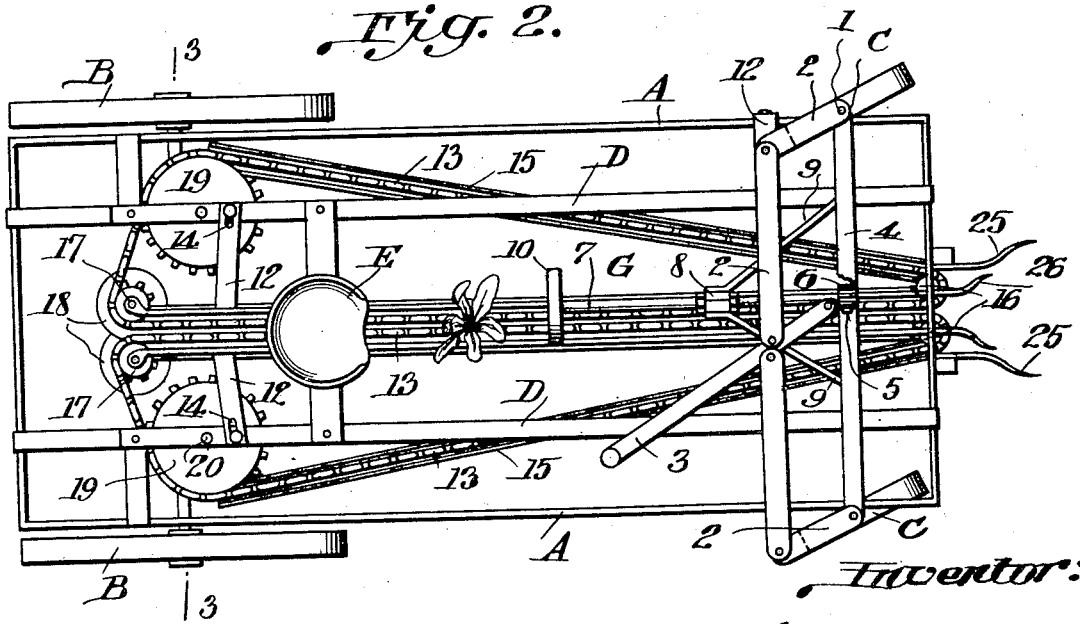
Figure 3:
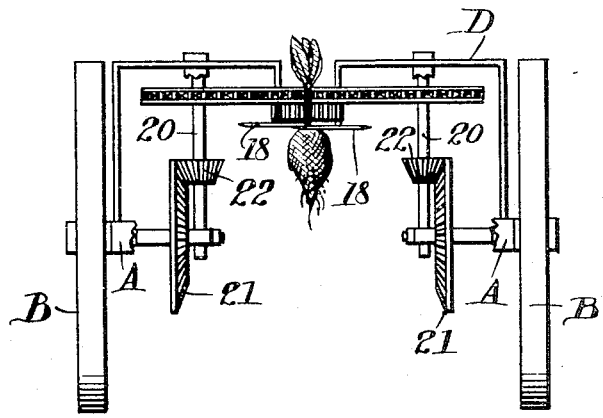
Figure 4:
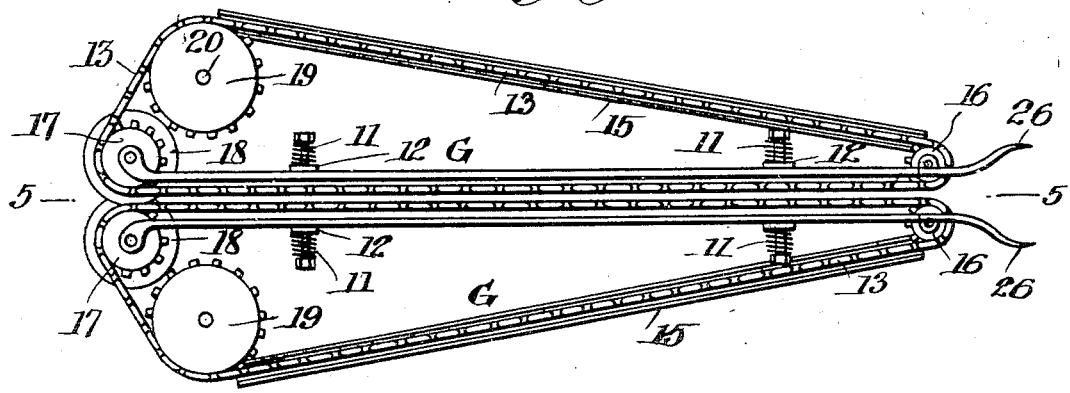
Figure 5:
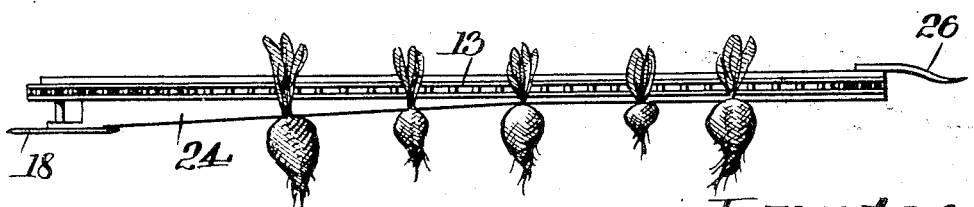

In the drawings Figure 1 is a side elevation of the machine. Fig. 2 is a plan view of the same, parts cut away, and showing the front wheels directed to turn the machine to the left. Fig. 3 is rear elevation of the traction wheels and portions of the main frame, carrying belts or chains and the gear and sprocket wheels which move said chains on line 3 3 of Fig. 2. Fig. 4 is a plan view of the carrying chains, guide frames and driving elements for said chains. Fig. 5 is a side elevation of one side of the carrying chain and frame, on line 5 5 of Fig. 4.

My machine consists of a main frame A which is mounted on wheels B at the rear and C in front. An upper frame D is secured to and above the said main frame on which the driver is seated in seat E. The front wheels C are journaled in inverted U-shaped yokes F, to each of which a vertical shaft 1 is secured and by which the said wheels may be directed to turn the machine. The said shafts 1 are turned and the said wheels directed by means of the shifting frame 2 and lever 3. An inverted U-shaped yoke 4 is mounted over the front portion of said frame A and is carried on said shafts 1 and to which said shifting frame 2 is pivoted. Two opposed triangular guide frames G are suspended from said upper frame D at the rear end, and their front ends are carried on the front wheels by means of said yoke 4 and a vertical rack 5, which has teeth cut on one side to receive and mesh with the teeth of a pinion 6. The said pinion 6 is secured on one end portion of a hand shaft 7 which is journaled at its front end on said yoke 4 and has another bearing 8 that is mounted in the stay rods 9. A hand wheel 10 is provided on the rear end of said shaft 7 by which said shaft is rotated and said pinion 6 is turned on its axis. The said pinion when turned engages the teeth of said rack 5 and raises or lowers the front end of said frame A, guide frames G and the digging, pulling and carrying elements. Spiral springs 11 are provided in the braces 12 to yieldingly hold the longer sides of said guide frames G in close proximity and the chains 13 in contact with the foliage of the beets. Slotted holes 14 are provided in said braces 12 to allow further adjustment of said guide frames G. Channel irons 15 are used to form chain races for the two longer sides of said guide frames G, to prevent said chains from sagging in the longer stretches. Sprocket wheels 16 are journaled in the front ends of said guide frames, and sprocket wheels 17 are similarly mounted at the rear ends. On the lower end of the shafts of said sprocket wheels 17 are secured the cutting disks 18 by which the beets are topped.

The driving sprocket wheels 19 are secured on the vertical shafts 20 which are journaled between the said frame D and the axles of the said wheels B. Secured on each of the respective axles of the wheels B is a bevel gear 21 that meshes with an adjacent bevel pinion 22 which is secured on said vertical shaft 20, and by which the motion of said wheels B is imparted to the driving sprocket wheels 19. Beet carrying chains 13 are carried by said sprocket wheels 16, 17 and 19. A wedge shaped piece of metal 24 is fastened on the lower side and rear portion of the parallel sides of said guide frames G to engage and adjust the heads of the beets as they are carried toward the rear of the machine and force them all to the plane of said disks 18 where the foliage is cut from the body of the beet. Plow points 25 are fastened to the front of the said frame A by which the beets are loosened in the ground and partially raised. Guide fingers 26 are secured on the front of said guide frames G to engage the foliage of the loosened beets and direct said foliage between and until it is caught by the moving chains 13.

The operation of my machine is as follows:—The machine is drawn, preferably by horses, over a row of beets. The front end of the machine is lowered by rotating said shaft 7 until the plow points 25 enter the ground, one on each side of a row of beets. This will break the soil and loosen the beets. As the machine is advanced the guide fingers 26 direct the foliage of the beets between the sprocket wheels 16 and chains 13. The foliage is caught by said chains as it passes between said chains near the front spiral springs 11 and held firmly by said chains and as the chains are guided on an incline the beets are pulled from the ground and carried toward the rear of the machine and passed between the disks 18 where the foliage is cut from the body of the beet. As the beets are carried along beneath the parallel sides of the guide frames G the upper ends of the bodies, contact with the lower edges of the wedge pieces 24, and if a beet has grown partially out of the ground, it is forced downward to the plane of said disks 18 and is cut just as though it had grown low in the ground. As all of the beets must pass along and beneath the said wedges 24 they are all brought with the upper part of their bodies to the same level. If desired the severed foliage may be caught by devices not shown and carried to one side and saved for ensilage, and the bodies fall to the ground.

Having thus described my machine I desire to secure by Letters Patent and claim—

1. In a beet harvester the combination of a wheeled frame with its front portion vertically adjustable; means to loosen the beets in the ground; a pair of opposed guide frames secured at an incline on said frame; chains yieldingly held in contact and operated in said guide frames to engage the foliage of the beets and pull the beets from the ground; wedge shaped pieces secured to the underside of said guide frames with their apices thinned and tightly held against said guide frames to gradually adjust the bodies of the beets and not catch the foliage of the beets; and means to cut the foliage from the body of the beets.

2. In a beet harvester the combination of a wheeled frame; means to loosen the beets in the ground; a pair of opposed guide frames suspended at an incline on said frame; chains operated in said guide frames to engage the foliage and pull the beets from the ground; parallel side pieces on said guide frames increasing in vertical thickness toward their rear ends to allow the foliage to pass freely and engage the bodies of the beets to adjust them longitudinally; and means to cut the body of the beets from the foliage.

In testimony whereof I have affixed my signature in presence of two witnesses.

GEORGE ACKERMAN.

Witnesses:
SAM RANEY,
ARTHUR VAN BUSKIRK.